Nov. 19, 1968     J. M. DON     3,411,194
CUTTING AND ABRADING TOOLS
Filed July 7, 1966
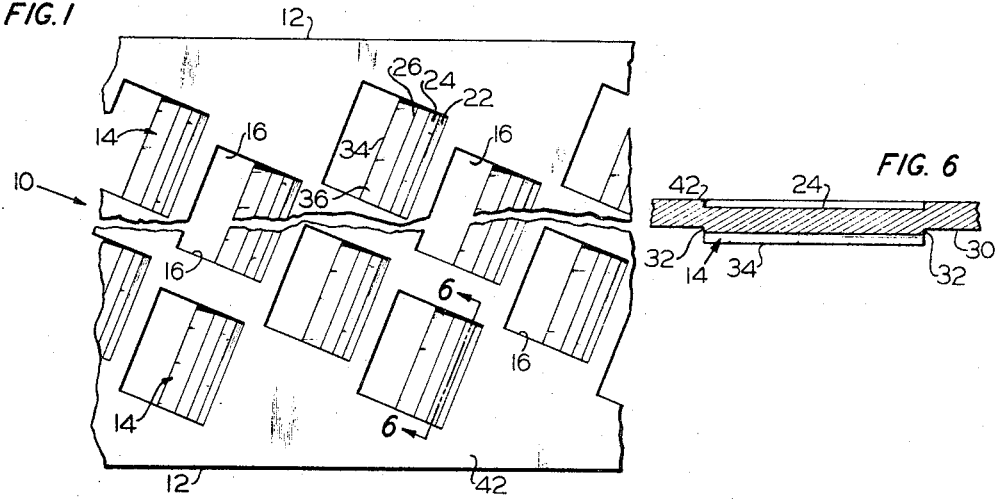
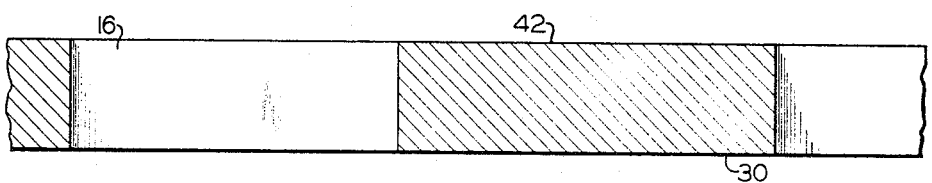
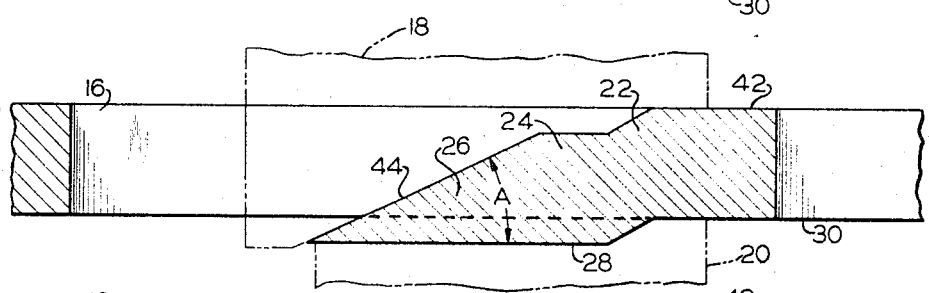
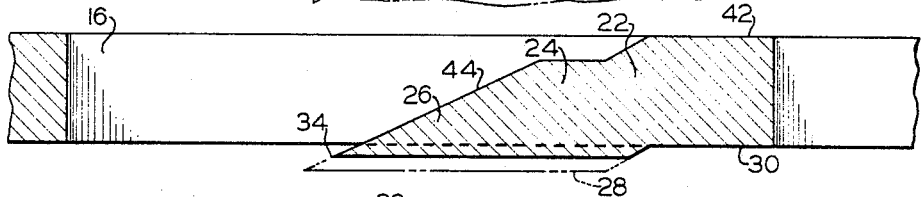
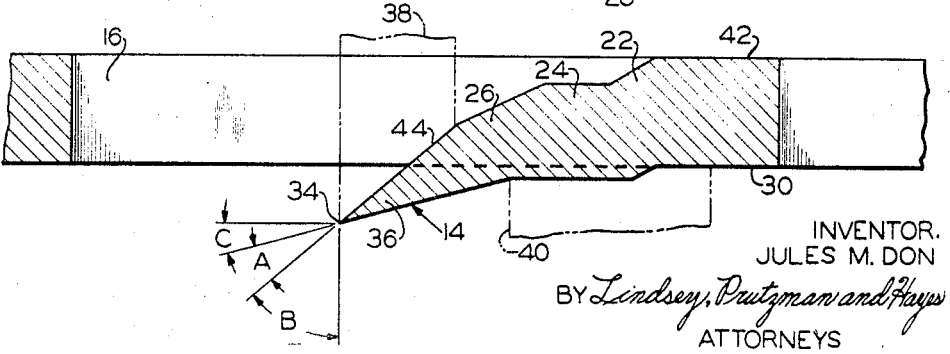
INVENTOR.
JULES M. DON
BY Lindsey, Prutzman and Hayes
ATTORNEYS United States Patent Office 3,411,194
Patented Nov. 19, 1968

3,411,194
CUTTING AND ABRADING TOOLS
Jules M. Don, Naugatuck, Conn., assignor to The Stanley Works, New Britain, Conn., a corporation of Connecticut
Continuation-in-part of application Ser. No. 397,249, July 24, 1963. This application July 7, 1966, Ser. No. 563,419
6 Claims. (Cl. 29—78)

This application is a continuation-in-part of application Ser. No. 297,294, dated July 24, 1963.

The present invention relates to cutting and abrading tools of the type made from sheet metal and having a number of integral cutting elements formed therein for engagement with the workpiece. More particularly, it relates to a new and improved construction for such tools, particularly the cutting elements thereof, and the method of making such elements and the tools containing them.

It is an object of the present invention to provide a cutting and abrading tool possessing highly effective cutting elements of strong tooth form and an improved internal metal structure which prolongs the durability and effectiveness thereof.

Another object of this invention is to provide a new and improved cutting tool of the type in which the cutting elements are integrally joined to the tool body through their root portion and wherein the cutting elements may be provided with optmium rake, included and clearance angles for the intended purpose of the tool while retaining strength, efficiency and durability.

An additional object of the present invention is to provide a cutting tool of improved quality by means of a method utilizing standard and simple manufacturing operations and possessing a high degree of versatility such that desired variations in tooth dimensions and angles for various purposes are possible and may be effected with a minimum tooling.

It is a further object of this invention to provide a method of producing cutting and abrading tools which is simple and economical to use and which is effective for mass production of tools of uniform high quality at low costs and wherein the tools produced are of rugged design adapted for long service life in a wide variety of uses.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawing:

FIG. 1 is a fragmentary plan view of an embodiment of the tool blade of the present invention;

FIGS. 2–5 are enlarged sectional views through a single cutting element of the tool blade illustrating the sequential stages of its manufacture; and FIG. 6 is an enlarged view taken along the line 6—6 of FIG. 1.

According to the present invention, the cutting and abrading tool, which may take the form of a file, rasp, band or disc, is formed by initially punching a plurality of holes in a strip of sheet metal; causing a portion of the metal at the peripheries of the holes to cold-flow under the action of a pair of dies thereby fashioning the initial configuration of the cutting elements and the included angle desired for the particular tool; grinding one surface of the cutting elements to form the final cutting edges and tooth dimensions; and finally bending or forming the cutting edge portions of the cutting elements so as to provide the final tooth configuration and rake and clearance angles. The cutting elements thus produced may be then treated to obtain the desired hardness and finished appearance.

Referring now to the invention in greater detail and with respect to the drawing, FIG. 1 shows a portion of a finished cutting tool blade 10 made in accordance with the invention. For convenience and brevity of description, the tool will be described specifically in connection with a tool intended for hand operation in the filing of wood; although it may be produced in other forms and for use in connection with other materials. For hand operation in connection with the filing of wood, the tool will be preferably formed of a piece of strip steel having a width of the order of 1½ to 2 inches and a length of approximately 10 inches or more. The thickness of the strip steel also may vary in accordance with the intended purpose of the tool. For use in connection with wood, a thickness of the order of .01 to .04 inch is generally commercially acceptable; whereas for tools intended for use with harder materials, a thicker sheet steel will be used.

The tool blade 10 has edges 12 parallel to the longitudinal axis of the blade end, as shown in FIG. 1, comprises a series of teeth or cutting elements 14 arranged in rows inclined at an angle to the blade edge 12, and to the normal cutting direction of the tool which, as viewed in FIG. 1, is from right to left. Each tool or cutting element 14 is preceded by an aperture or clearance hole 16, and the teeth 14 are in staggered relationship. The form of each of the cutting teeth 14 is shown in detail in FIGS. 5 and 6 of the drawing, and the method of forming the teeth is exemplified by the illustrations of FIGS. 2–5 of the drawing.

As illustrated in FIG. 2 of the drawing, the strip steel which will constitute the cutting blade 10 is first pierced or punched to form initial clearance holes or slots 16. This operation may be carried out conveniently by means of a punch press of conventional design, the metal at the hole or slot portions being completely severed from the blade. The size and shape of the openings 16 may be varied according to the intended purpose of the tool and the final design desired. For optimum results, it is preferred that the openings 16 be rectangular in shape, as best shown in FIG. 1 of the drawing. The holes 16 are preferably of a sufficient size to provide the desired chip clearance after the final tooth form is produced while at the same time the size of the openings is kept to a minimum for maximum strength of the blade. By way of specific example, in preparing a tool particularly adapted for filing wood, the openings 16 are preferably of the order of .15 to .20 inch in length and approximately .06 to .08 inch in width. The number of holes 16 and spacing thereof will depend upon the number and location of the teeth desired.

Following the punching operation of the metal strip, a portion of the blade rearwardly of each initial clearance hole 16 is fashioned by swaging into the initial stage of the tooth form, as illustrated in FIG. 3. The swaging operation may be carried out by a pair of dies 18, 20 which operate against the blade areas rearwardly of each of the rectangular initial clearance slots 16.

In order to more fully understand the invention, the unitary initial tooth form of the teeth 14, as shown in FIG. 3, may be considered to possess three contiguous portions; a root portion 22, a shank portion 24 and a tongue portion 26. The action of dies 18 and 20 against the body of the metal sheet rearwardly of the openings 16 causes the root portion 22 of the tooth to be bent downwardly at an angle from the plane of the main body portion of the metal sheet. In the specific embodiment shown in the drawing, the angle is approximately 30 degrees, although this is not critical and may be varied within reasonable limits. At the same time, the shank portion 24 is depressed and offset downwardly from the upper surface 42 of the strip. This disposes the lower surface 28 of the shank portion 24 below the bottom surface 30 of the main body portion of the tool blade 10 to permit the subsequent grinding operation to be described later. At the same time, the left-hand portion of the tooth, as viewed in the drawing, is deformed or cold-forged into the acute tongue portion 26 providing the initial breast or rake face 44 of the tooth. In this operation, the side edges 32 of the tooth are not severed from the main body portion of the tool, as best shown in FIG. 6, thus retaining maximum strength and support. At the same time the metal of the tongue portion 26 of the tooth is compacted and densified by the swaging operation causing a material increase in the strength thereof.

The swaging operation resulting in the forwardly projecting acute tongue portion 26 forms an initial rake face 44 and determines the included angle A of the final tooth 14, which angle is, at the same time, related to the final forming step for determining the rake and clearance angles which may be applied to the tooth. It is an advantage of the invention that a tooth form having a greater included angle which provides a stronger and more rugged tooth form will also permit a minimum final rake angle and vice versa. Accordingly, when the tool is intended for use with soft materials such as wood, the tooth portion may be given an included angle of the order of 30 degrees which provides a sufficiently rugged tooth structure for this use while at the same time permitting a relatively large rake angle. On the other hand, if the tool is for use on relatively hard material, the included angle may be increased to as much as 80 degrees which greatly increases the tooth strength and at the same time permits the formation of a rake angle of the order of 0 to 10 degrees. In either case, the tooth strength is greater than in teeth of comparable dimensions made in a normal stamping operation due to the densifying and compacting effected during the swaging operation.

Following the swaging operation, the initial tooth form undergoes a grinding operation so as to remove a minor amount, for example about .003", of that portion of the tooth which extends below the bottom surface 30 of the tool blade 10. As shown in FIG. 4, the grinding is in a plane parallel to surface 30. The grinding serves to remove lower surface 28 and to additionally remove any surface irregularities that may be present as a result of the prior operations, while at the same time providing a sharp cutting edge 34. While the portions of the root, shank and tongue extending below surface 30 of tool blade 10 may be completely removed, if desired, so long as the strength of the tooth is not detrimentally affected thereby, it is an advantage of the invention that only a very small portion of the initial tooth form need be removed, thus permitting the major portion of the sheet metal to contribute to the strength of the structure and reduce the time and cost inherent in an extensive grinding operation.

The final tooth form, as shown in FIG. 5, is obtained by bending or forming downwardly the forward end or lip 36 of tongue 26 containing cutting edge 34 so as to produce the final rake angle B and at the same time produce a clearance angle C for the tooth. This operation may be accomplished by subjecting the forward half of tongue portion 26 to a pair of bending or forming dies 38, 40 which will cause the lip 36 of tongue 26 to bend outwardly from surface 30 of tool blade 10 and thus establish the final rake and clearance angles as well as the bite or distance between surface 30 and cutting edge 34. The final tooth form thus produced may then be hardened using conventional techniques and the desired finish may be applied to the blade.

As mentioned hereinabove, the rake and clearance angles are interrelated with the included angle formed by the swaging operation and will vary depending upon the materials to be cut; for instance, wood, leather and materials of related hardness are best cut with tools having a rake angle of 20°–45° and a clearance angle of 15°–20°. For cutting materials in the hardness range of soft steel or gray iron, it is desirable to use a rake of 0 to 15 degrees and a clearance angle of 10 to 15 degrees while materials of intermediate hardness such as plastics and soft metals require a rake of about 15 to 40 degrees and a clearance angle of 10 to 15 degrees.

As best shown in the sectional views of FIGS. 5 and 6, the tooth 14 integrally depends from the body of tool blade 10 both at its rearward portion through root 22 and along a substantial portion of its sides 32. That dependence in conjunction with the structural configuration of the teeth 14 imparts improved strength and durability to the cutting elements and through the cutting elements to the tool. The configuration of the shank portion 24 which, as shown, is slightly offset from the body of blade 10 gives the beneficial "back up" support and integrity from adverse bending in the areas of juncture with the body of the blade. Further, it advantageously provides a sturdiness of structure along the component of greatest force due to the offset location of the shank portion and the substantial retention of material within that portion.

In addition to the support provided by the "back up" portion of the cutting elements, the invention facilitates optimum adjustability among the interrelated included, rake and clearance angles while imparting added durability to the leading portion of the cutting elements. The swaging operation with its forwardly extruding cold-flow of the metal and the associated densification of the tongue portion not only imparts greater strength to that portion of the cutting element but results in the formation of any desired included angle and its related rake and clearance angles. The relationship between the latter two angles is limited by the included angle formed during the swaging operation, but is, of course, finally determined by the forming operation which also sets the bite or maximum depth of cut. Further, since the rate of bite or "dig" is also a function of the rake and clearance angles, the present invention provides the optimum adjustment for all of those related factors. In addition, it enables the adjustment of those interdependent relationships by means of simple and reliable operations at low cost while increasing the quality of the product.

As will be apparent to persons skilled in the art, various modifications and adaptations of the structure above described will become readily apparent without departure from the spirit and scope of the invention, the scope of which is defined in the appended claims.

I claim:

1. In a cutting and abrading tool a sheet metal blade body having a plurality of openings therein, and cutting elements associated with said openings and forming an edge portion thereof rearwardly of the cutting direction of the tool, each of said cutting elements comprising a shank portion offset from and integrally joined to the blade body, said shank portion having a densified tapered tongue portion at its forward end forming a cutting edge, said cutting edge projecting below the lower surface of the blade body, the breast and rear surfaces of said tongue extending at an angle to the blade body to form predetermined rake and clearance angles for the cutting element.

2. A cutting and abrading tool as set forth in claim 1 wherein each of said cutting elements comprises a root portion integrally joined to the blade body and extending downwardly and forwardly at an acute angle thereto, said shank portion being integrally joined to and extending forwardly from the root portion at an angle thereto, and said tapered tongue portion being integrally joined to and extending forwardly from the shank portion.

3. A cutting and abrading tool as set forth in claim 1 wherein each of said cutting elements comprises a root portion integrally joined to the blade body and extending downwardly and forwardly at an angle thereto, said shank portion being integrally joined to and extending forwardly from the root portion at an angle to the root portion with its upper surface disposed below the upper surface of the blade body, and said tongue portion being of diminishing cross section and integrally joined to and extending forwardly from the shank portion, the metal of said tongue portion being of a density different from the remaining metal of the blade.

4. A cutting tool as set forth in claim 2 wherein said root portion is integrally joined at its side and rear edges with the blade body and said shank portion is depressed downwardly from the upper surface of the blade body.

5. A cutting tool of claim 4 wherein the cutting elements and associated openings are generally rectangular and disposed in successive rows extending transversely of the cutting direction of the tool.

6. A cutting tool as set forth in claim 1 wherein each of said cutting elements comprises a root portion integrally joined at its side and rear edges with the blade body and bent downwardly and forwardly at an acute angle thereto, said shank portion being integrally joined to and extending forwardly from the root portion at an angle thereto and being integrally joined at its side edges to the blade body, said root and shank portions having substantially the same thickness as the metal of the blade body, said tapered tongue portion being integrally joined to and extending forwardly from the shank portion and having a portion of its side edges integrally joined to the blade body.

References Cited

UNITED STATES PATENTS

| 2,984,892 | 5/1961 | Oxford | 29—78 |
| 3,174,363 | 3/1965 | Staiger | 76—24 |
| 3,289,497 | 12/1966 | West | 76—24 |
| 3,290,917 | 12/1966 | Don | 76—101 X |

HARRISON L. HINSON, *Primary Examiner.*